United States Patent Office 3,369,507
Patented Feb. 20, 1968

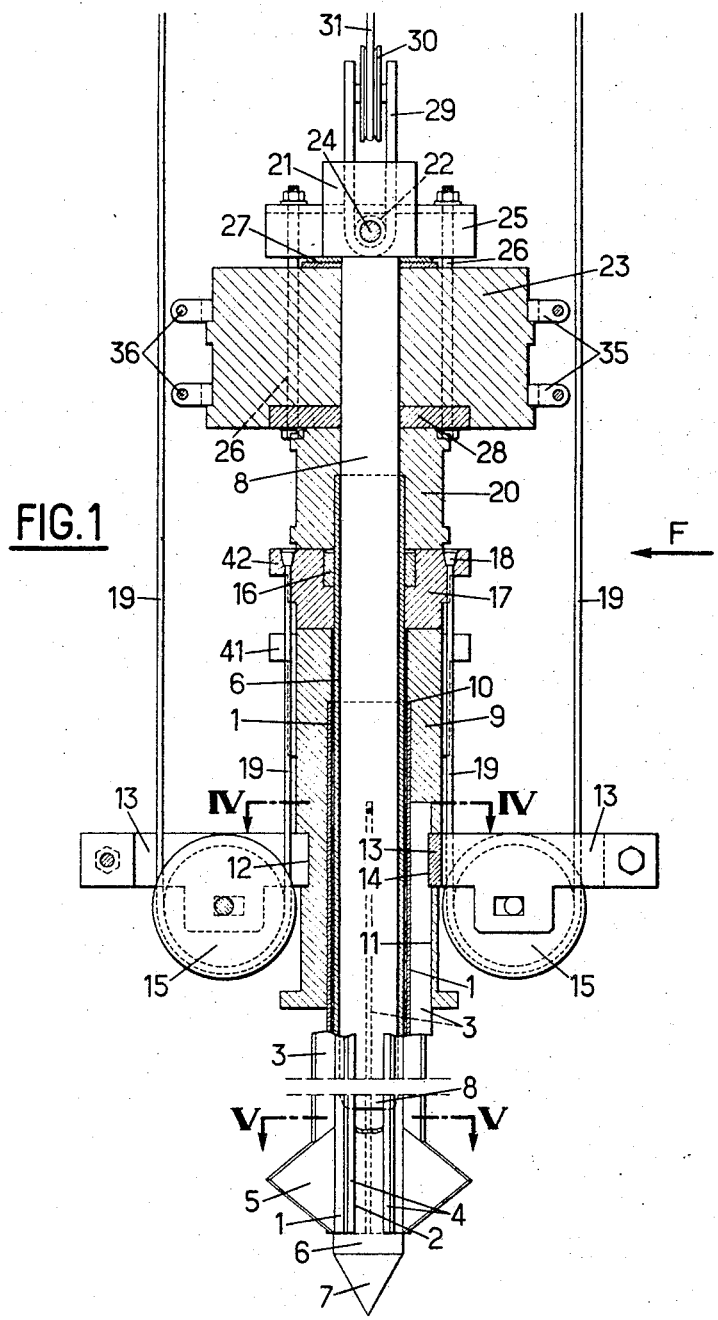

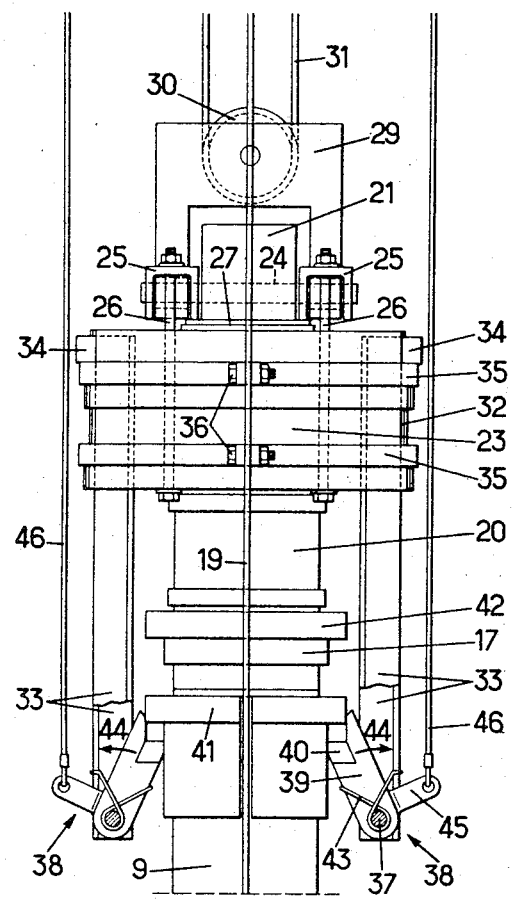
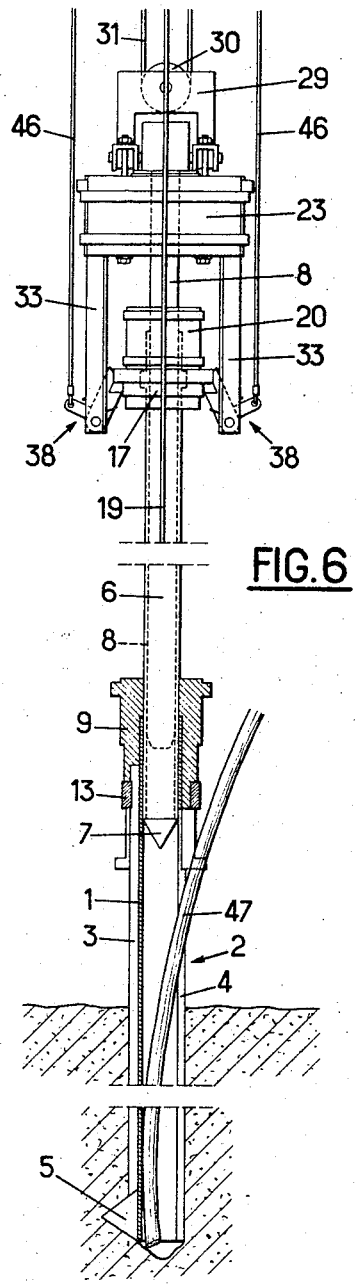

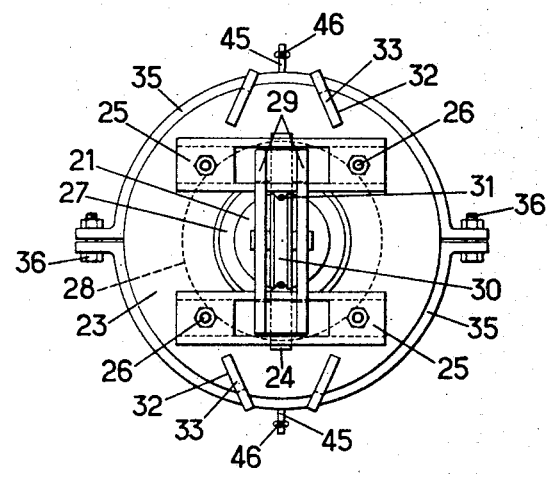
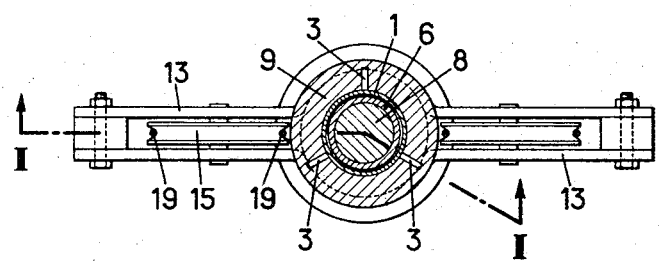
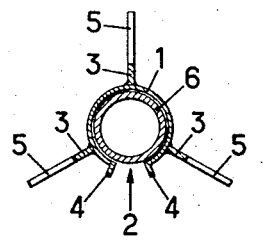

3,369,507
PLANTING APPARATUS
Henri De Castelbajac, Beaumarches, France
Filed Mar. 31, 1966, Ser. No. 539,205
3 Claims. (Cl. 111—89)

ABSTRACT OF THE DISCLOSURE

A device for inserting plants into the ground which comprises a cylindrical sheath provided with a lateral slot, a plunger slidable within the sheath, means for driving the plunger and sheath into the ground together and means for withdrawing said plunger from the sheath so that a palnt may be inserted through the slot into the space vacated by withdrawal of the plunger.

---

It is well known that, when planting certain plants, and especially trees, it is often necessary to position the lower end of the plant at a substantial depth, of the order of three feet or more. If conventional means are used for this purpose, for example, a mechanical shovel, a substantial volume of earth must be removed, which it is difficult to repack conveniently around the plant. Conversely, if a straight hole is driven with a post or pile, the surrounding earth may fall into the hole when the post is pulled out, thus preventing the insertion of the plant in those areas where the earth is not so cohesive as to prevent such crumbling.

One object of the present invention is to provide a new method of planting plants in the earth essentially characterized by the fact that a post encircled by a sheath which is C-shaped in section so as to be formed with a longitudinal slot is first driven into the ground. The post is then partially withdrawn to permit access to the upper part of the sheath through a large enough opening above the ground to permit the insertion therethrough of the plant or other object which is to be planted, after which the sheath is withdrawn.

Another object of the invention is to provide a device for carrying out the foregonig method, characterized by the fact that it comprises a post provided with a sheath having a longitudinal slot therein, which sheath is preferably ribbed, and is slidable with respect to the post. The device also comprises means for sinking the post and sheath, means for extracting the post, and means for extracting the sheath.

In order that the object of the invention may be better understood, one embodiment thereof will now be described, purely by way of illustration, and with reference to the accompanying drawings, on which:

FIG. 1 is an axial section through the essential portion of the device, taken along the line I—I of FIGURE 4;

FIG. 2 is a vertical elevational view looking toward the side indicated by the arrow F in FIGURE 1;

FIG. 3 is a top plan view of the device;

FIG. 4 is a section taken along the line IV—IV of FIGURE 1;

FIG. 5 is a section taken along the line V—V of FIGURE 1; and

FIG. 6 shows on a reduced scale how one characteristic step in the method is carried out.

As seen best in FIGS. 1, 4 and 5, the device comprises a sheath 1, which is generally cylindrical but is provided with a longitudinal slot 2. This sheath is preferably also provided with longitudinal ribs 4 which extend along the edges of the slot and three ribs 3, each of which terminates in a blade 5 the purpose of which will be explained later.

A post 6 slidably positioned within the sheath 1. This post is preferably tubular, ends in a point 7, and is mounted on the end of a cylindrical guide rod 8, attached to suitable driving means.

A member 9 is positioned at the upper end of the sleeve 1. This member is made of cast iron, serves as an anvil, and is provided with a bore in which the sleeve is slidable. The upper end of the bore terminates at a shoulder 10, which marks the beginning of a coaxial bore of smaller diameter in which the post 6 is slidable. Recesses 11 are cut into the member 9 and receive the upper ends of the ribs 3. The anvil 9 is encircled by a neck 12 which communicates with the recesses 11 and receives the two halves 13 of a split collar, by means of which the three ribs of the sheath are attached to the anvil. These ribs are seated in suitable notches 14. The two halves of the split collar hold between them two pulley wheels 15, the purpose of which will be hereinafter explained. The assembly comprising the anvil and these collars is consequently fixed to the end of the sheath 1.

The end of the post 6 which projects beyond the anvil 9 is provided with a collar 16 welded thereto. This collar is seated in a cast iron distance piece which is provided with a bore to receive the post. At the upper end of the bore is a shoulder at the bottom of a larger bore, which receives the collar 16. This distance piece is also provided with means 18 for fastening thereto two cables 19 which run over the pulleys 15 and are used to extract the heath. A third cast iron member 20 is positioned above the distance piece 17 and serves as an anvil for the post. The anvil 20 likewise comprises a lower bore to receive the post, a shoulder at the top of this bore which rests on the top of the post, and a smaller upper bore which receives the rod 8. This rod ends in a head 21 pierced by a transverse hole 22 and extends through a cast iron block 23, which serves as a driving weight.

A pin 24 extends through the hole 22 and through two U-shaped members 25 positioned on opposite sides of the head 21. Four bolts 26 extend through the weight 23 and the U-shaped members 25, thus fastening the head 21 to the weight 23, acting through the pin 24 and the washers 27. The other ends of these bolts fasten on a heavy mild steel washer 28 so as to avoid damage to the anvil 20 due to contact with the weight 23.

The U-shaped members are grooved to receive the lower ends of a pulley-block 29 having the shape shown in FIGS. 1 and 2, which is free to swing about the pin 24. A pulley wheel 30 turns in this block and a cable 31, which passes over this pulley wheel serves to lift the weight 23.

The weight 23 is also provided at its periphery with four slots 32, as shown on FIG. 3. These slots are parallel to the axis of the apparatus but inclined with respect to its radii. In each slot 32 is an iron plate 33 comprising at its upper end a projection 34 which extends outwardly from the weight. Two rings 35 bearing against suitable shoulders on the weight 23 and held in place by bolts 36 fasten on the four plates 33, the projections 34 of which bear on the upper ring.

The lower end of each of the plates 33 is obliquely pierced to admit a pin 37 which fastens each plate 33 to the adjacent plate. A pawl 38 swings freely about each of the pins 37, and is made of two parts 39 joined by a cross-member 40, so that it may be hooked under the collar 41 at the upper end of the anvil 9 or the collar 42 at the upper end of the distance piece 17. The springs 43 constantly urge each of the pawls 38 in the direction indicated by the arrows 44. A small lever 45, laterally attached to each of the pawls 38, is attached at its outer end to a cable 46 which, when pulled, causes the notches at the ends of the pawls 38 to hook under the collar 41 or 42.

In order to make use of this apparatus, a lifting device capable of lifting it to an appropriate height is naturally required. This may comprise a crossbar to which the upper pulley wheels for the lifting cable 31, the cables 19 for extracting the sleeve and the cables 46 which control the pawls are attached. One of the ends of the cable 31 attached to the upper end of the lifting device so that a mechanical advantage can be obtained by use of pulley blocks, while the other end is attached to a hoist. The two ends of the cable 19 are connected over a pulley block to equalize the tensions therein and are both controlled by a hoist, while the cables 46 may be connected to a manual control. Alternatively, a hoist equipped with two drums and a single reduction gear may be used to control the cables 31 and 19. Each drum is then, of course, equipped with the conventional clutch, brake and dead center point.

The apparatus as shown on FIGS. 1 and 2, that is to say, with the pawls in engagement with the collar 41 on the member 9, may be lifted by the lifting cable 31 into position over the spot at which the planting is to be done. When the lower end of the device encounters the ground the pawls 38 are released by the springs 43 and assume a vertical position. By then alternately manipulating the clutch and the dead center point of the hoist controlling the cable 31, the weight 23 may be lowered along the rod 8, thus driving in both the post 6 and the sleeve 1. The successive blows are transmitted through the washer 28 to the anvil 20, and through its shoulder to the post 6, thence to the distance member 17, the anvil 9, and, through the shoulder 10, to the sleeve 1.

When the device has been driven far enough in, the cables 46 are caused to swing the pawls into engagement under the collar 42, so that when the clutch controlling the cable 31 is engaged the hoist will lift both the weight 23 and the post 6, leaving the sleeve 1 in place.

When the stage shown schematically in FIG. 6 is reached, the plant or other object which is to be planted is introduced through the portion of the longitudinal slot 2 which is above the ground and below the anvil 9. Usually this will be a plant having few roots, which is then pushed down inside the sleeve until it strikes the bottom of the hole.

Then while keeping cable 31 braked, cables 19 may be wound up to lift the sleeve vertically out of the hole, since it slides on the post 6 due to the action of the pulleys 15, the cables 19 being attached at 18 to the member 17, connected by the pawls 40 and the members 33 to the weight 23 suspended from the cable 31.

While the sleeve 1 is being lifted, the plant 47 continues to pass through the slot 2 and is in no way disturbed, even if the upper end of the plant or object 47 is quite long or comprises bulky components, such as branches. At the same time the blades 5 at the end of the sleeve disturb the earth so that it begins to fall in around the lower part of the plant 47.

When the lower end of the sleeve 1 reaches the neighborhood of the lower end of the post 6, which remains in the position shown in FIG. 6, the anvil 9 encounters the lower face of the distance piece 17 and raises the latter due to the traction exerted by the cables 19, thus releasing the pawls 38, which may again become engaged beneath the collar 41 after it has been moved by the cables 46. The device is then ready to be used again.

The device and the process according to the invention make it possible to plant objects safely, rapidly and deeply in ground which is very friable.

In certain cases in which one must deal with a layer of loose ground, such as sand, on top of a more compact and impermeable layer, an analagous device may be used in which the post 6 extends substantially below the lower end of the sleeve 1, so that the post may be driven into the compact ground while the sleeve only penetrates the sandy layer. During extraction of the post the compact layer does not crumble into the hole and the friable layer is held in place by the sleeve, which acts just as hereinbefore described.

It will be appreciated that the embodiment and method of carrying out the invention which have been described have been given purely by way of example and may be modified as to detail without thereby departing from the basic principles of the invention. In particular, the same process may be used to plant in any malleable, friable, or resilient medium, any object having a thin lower end, even though its upper part is relatively cumbersome.

What is claimed is:

1. A planting device comprising in combination an elongated member, a hollow sheath encircling said elongated member, said sheath having upper and lower ends and a longitudinal slot extending upwardly from said lower end, said sheath and elongated member being relatively slidable between a position in which said elongated member projects from said lower end and one in which it is withdrawn within said sheath to clear said lower end, a weight slidably mounted on said elongated member, means for raising and lowering said weight, means carried on said elongated member through which the impact of said weight, when lowered, is transmitted to both said elongated member and said sheath, releasable means connecting said elongated member to said weight for longitudinal movement therewith independently of said sheath to clear the lower part of said sheath adjacent said slot and means connected to the upper part of said sheath for lifting said sheath while said weight and elongated member remain stationary.

2. A planting device as claimed in claim 1 comprising means for automatically releasing said releasable connecting means when the lower end of said sheath strikes the ground.

3. A device as claimed in claim 1 comprising external longitudinal ribs on said sheath which terminate at their lower ends in cutting blades.

References Cited

UNITED STATES PATENTS

| | | | |
|---|---|---|---|
| 431,841 | 7/1890 | Davis | 111—95 |
| 1,257,544 | 2/1918 | Snow | 111—7.3 |
| 1,866,943 | 7/1932 | Simmons | 175—23 |
| 2,539,271 | 1/1951 | Rianda | 111—99 |
| 2,857,864 | 10/1958 | Cromer | 111—95 |
| 3,126,847 | 3/1964 | Morris | 111—4 |

ROBERT E. BAGWILL, *Primary Examiner.*